Sept. 1, 1964 J. J. CONNOLLY ETAL 3,146,692
DIRECT-CONTACT GLASS PLATE TOASTER
Filed June 11, 1959 2 Sheets-Sheet 1
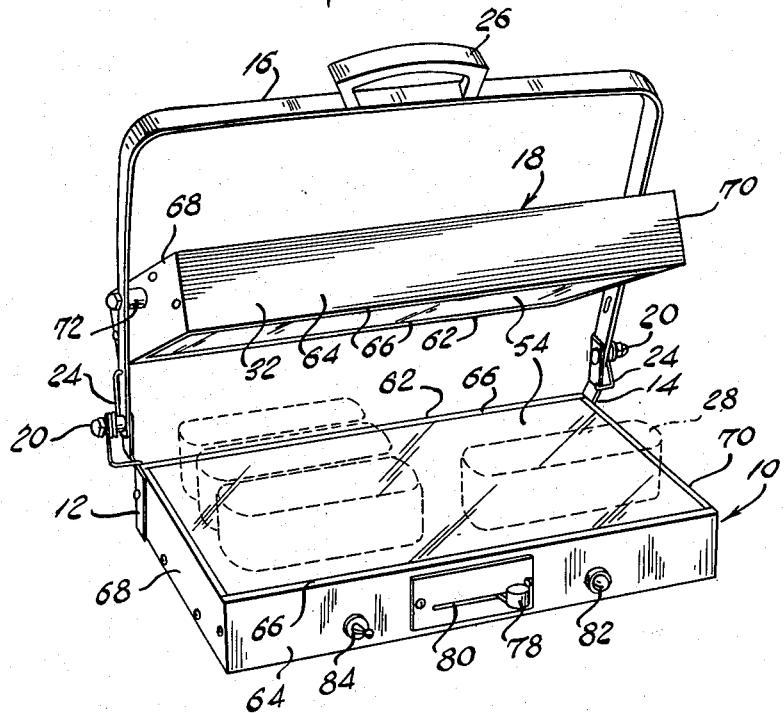
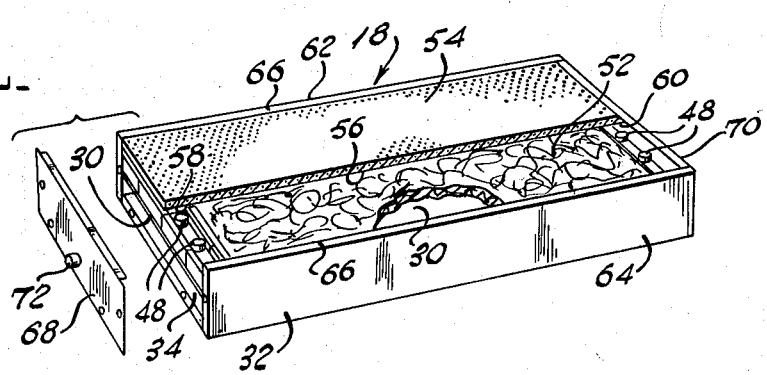
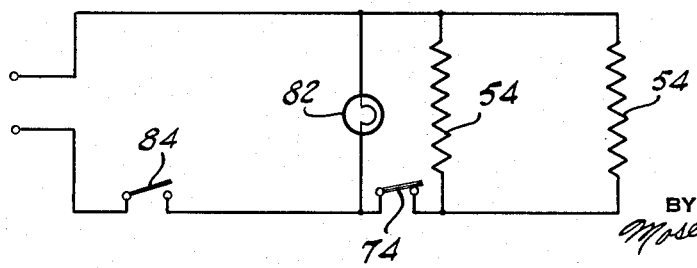
INVENTORS
JOHN J. RIOUX
JOHN J. CONNOLLY
PETER SANDO
TOSHI N. ASHIDATE
BY GEORGE N. MILES
Moses, Nolte, & Nolte
ATTORNEYS Sept. 1, 1964 J. J. CONNOLLY ETAL 3,146,692
DIRECT-CONTACT GLASS PLATE TOASTER
Filed June 11, 1959 2 Sheets-Sheet 2
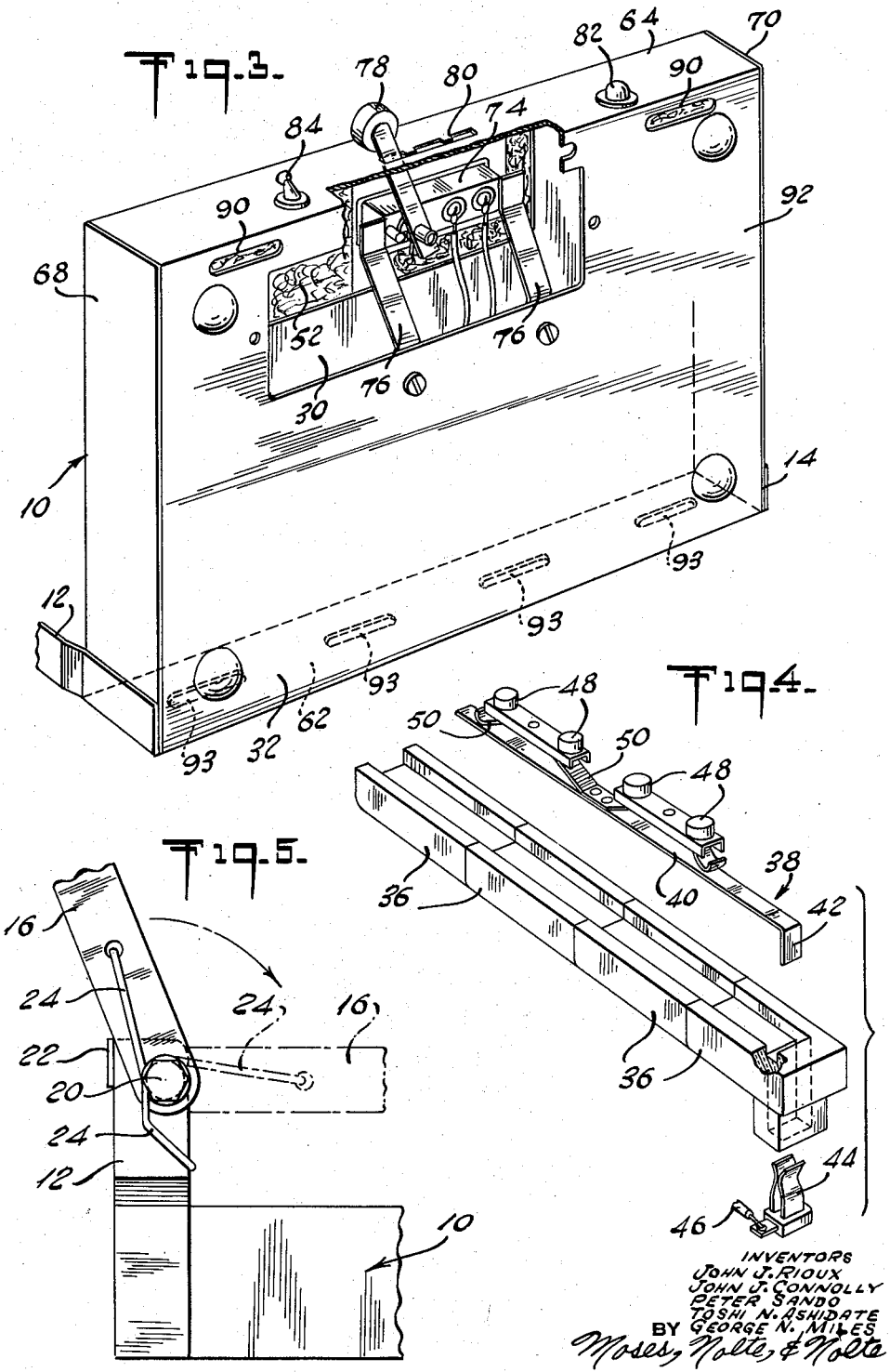
INVENTORS
JOHN J. RIOUX
JOHN J. CONNOLLY
PETER SANDO
TOSHI N. ASHIDATE
BY GEORGE N. MILES
Moses, Nolte, & Nolte
ATTORNEYS

United States Patent Office 3,146,692
Patented Sept. 1, 1964

3,146,692
DIRECT-CONTACT GLASS PLATE TOASTER
John J. Connolly, Pelham Manor, N.Y., John J. Rioux, Woodcliff Lake, and Peter Sando and George N. Miles, Tenafly, N.J., and Toshi N. Ashidate, Stuart, Fla., assignors to The Roll-a-Grill Corporation of America, New York, N.Y., a corporation of New York
Filed June 11, 1959, Ser. No. 819,704
1 Claim. (Cl. 99—379)

This invention relates in general to toasters and in particular to a new and useful toaster having a toasting surface comprising a material of low thermal conductivity such as glass having one surface coated with a thin film of electrically conductive material through which electrical current is passed to raise the temperature of the opposite surface for toasting materials thereon.

The present invention includes, in one embodiment, a flat surface toasting element having a low thermal conductivity factor (K) in the range of 0.3 to 0.9 B.t.u. (hr.) (square foot) (° F./ft.) at normal ambient temperatures, e.g., "Pyrex" glass with a conductivity factor of 0.63 which is evenly heated over its entire area by a conductive coating on the underside thereof and which is connected electrically to a source of power through conductive cross strips arranged at each end of the plate.

In present toaster constructions it is usual to use materials with high thermal conductivity for the toasting surfaces, such as aluminum (K of 124) or stainless steel (K of 13). In using such toasting surfaces it is not too uncommon to find that bread or rolls which are toasted thereon are blackened in certain areas and not toasted in other areas. The reason for such uneven toasting is that the rolls or bread present roughened uneven surfaces which contact the toasting element at various spaced locations along the undersurface of the bread or rolls. At the areas of contact with the toasting element a high rate of toasting is effected because as fast as the heat of the toasting element is absorbed by the roll, the conductive material of the toaster surrounding the contacting areas conducts the heat to maintain these areas at elevated temperatures. As fast as the roll is heated at these areas the toaster surface in contact therewith is heated by conduction from the other portions of the element. The result, of course, is a generally unsatisfactory blackening of the toasted buns along the outwardly extending roughened areas rather than an even brown toasting thereof.

In accordance with the present invention, material of low thermal conductivity is used as the toasting element surface and this surface is uniformly heated throughout its entire area by a thin coating of electrically conductive material which is connected in an electrical circuit to raise the temperature thereof. The toasting surface is advantageously maintained at a temperature range of between 300 and 600° F. It was discovered in accordance with the invention that toast, rolls and similar materials which are placed thereon are browned uniformly and quickly and without the resulting blackened areas caused when using previous toasters. The toasting element of low thermal conductivity does not present areas of high thermal conductivity in contact with the rolls or bread but rather the heat is uniformly spread throughout the whole toasting surface area. Since the toasting element is of low thermal conductivity when points of contact with the rolls are made there is no tendency to continue to furnish heat at these areas at the expense of other heating areas and hence the rolls are evenly tosted. In addition to this advantage, the toasting element effects heating by radiation and convection in addition to conduction and this has been enhanced in the present construction by roughening the heat resistant material's toasting surface to present a multiplicity of high contact areas while maintaining a similar multiplicity of low areas out of contact with the bread or other elements to be toasted so that radiant heat toasting is more effective, and convective heating from circulating hot air is facilitated between the toasting surface and the other elements to be toasted. The circulating hot air and radiant heat hit those spots of the bread not in contact with the toasting surface and contribute to the even toasting of the total surface of the bread. In the present invention the high contact areas are .006 to .010 inch above the low areas out of contact with the elements to be toasted.

A further feature of this invention is the provision of a handle support for pivotally supporting one toasting element of a cooperative pair of elements and arranging the handle and one of the elements so that it may be balanced above the other element in an open position or swung downwardly over the other element. The handle construction is such that the top element may be positioned in close cooperating contact with the bottom element, when thin articles are to be toasted, or may be positioned in a raised spaced position above the other element when large items, such as thick rolls, are to be toasted.

Accordingly, it is an object of this invention to provide an improved toaster.

A further object of this invention is to provide a toasting element having a toasting surface provided by a material of low thermal conductivity, the underside of which is heated by a coating of electrically conductive material applied over substantially the entire surface thereof.

A further object of this invention is to provide a toaster for rolls, bread and the like comprising a toasting surface of a material of low thermal conductivity having its underface coated with a uniform coating of electrically conductive material which is connected in an electrical circuit to heat the toasting surface, and including a similar cooperating toasting surface which is positioned on a handle element which may be swung to an open position pivotally suspended above the first element, or to a closed position aligned above the first element.

A further object of this invention is to provide a toaster which is simple in design, rugged in construction and economical to manufacture.

The various features of novelty which characterize the invention are pointed out with particularlity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a perspective view of a toaster constructed in accordance with the invention;

FIG. 2 is a perspective view partly broken away of one of the toasting panel assemblies;

FIG. 3 is a bottom perspective view of the lower toasting panel assembly with the access cover removed;

FIG. 4 is an exploded perspective view of the electrical terminal elements and support for the heat resistant toasting plate;

FIG. 5 is a fragmentary side elevation of the lower toasting element mounting bracket for supporting the upper toasting element handle; and FIG. 6 is a schematic electrical diagram of the toaster.

Referring to the drawings in particular the invention as embodied therein includes a lower toasting panel assembly generally designated 10 having upstanding bracket members 12 and 14 arranged at each corner of one side, for pivotally supporting a U-shaped handle 16, which, in turn, pivotally supports an upper toasting panel assembly generally designated 18. The U-shaped bracket 16 is pivotally supported on bolts 20 which fit into the brackets 12 and 14 and it rests against a laterally extending portion 22 (FIGURE 5) of the associated bracket 12 or 14 when it is in an upright or open position (FIGURE 1). A coil spring 24 is connected to each leg of the handle 16 and is wound around a bolt 20 and has its opposite end positioned across the end of the associated bracket 12 or 14. When the U-shaped handle is moved downwardly it must do so against the force of the spring 24 which tends to support it in an upward position. The U-shaped bracket 16 is provided with an outwardly extending portion 26 to permit it to be swung up and down by grasping this portion with the hand. A feature of this construction is that when the upper toasting element 18 is swung downwardly in position over articles such as rolls 28 located on the lower toasting element 10, the handle 16 forms a front guard surface to prevent contact with the upper heating element 18 by the fingers of the hand. It should be appreciated that while the toasting panel assemblies 10 and 18 are insulated and not maintained at appreciably high temperature, contact with these elements by the hands would be somewhat unpleasant.

The U-shaped handle 16 is biased to an upright position by the spring 24 but the panel 18 is just heavy enough to maintain the toaster in a closed position with the panel assembly 18 resting on the lower assembly 10.

In accordance with the invention each of the toasting panel assemblies 10 and 18 includes a plate 30 which is positioned against the inside surface of an outer U-shaped channel member 32 of the panel assemblies. The U-shaped supporting plate 30 defines a space 34 between it and the adjacent wall of the member 32 to accommodate the electrical wiring of the assembly.

A plurality of U-shaped channel blocks 36 (FIGURE 4) made of an insulation material, are arranged along each edge of the plate 30. The blocks 36 accommodate electrical contact elements generally designated 38. The contact elements 38 include a flat horizontal base portion 40 and a substantially vertical portion 42 which fits into an electrical socket member 44 which is electrically connected through terminals 46 to a source of power. Each of the contact elements 38 is provided with spaced cylindrical carbon contact members 48 which are located on spaced upwardly extending resilient members 50, 50 which are secured to the horizontal portion 40 of the contact elements.

An insulation material 52 such as fiber glass or the like is positioned on the U-shaped plate 30 between the contact elements 38. In accordance with the invention a plate of low thermal conductivity generally designated 54, which is provided with a thin uniform coating of electrically conductive material 56 on its lower face, is positioned on top of the insulation with a solid electrically conductive strip area 58 and 60 on each edge aligned over the contact elements 38 and in touching contact with the carbon contact members 48. The plate is preferably made of a durable material of low thermal conductivity such as a glass. The channel member 32 is constructed, and the plate 54 is dimensioned, so that side walls 62 and 64 of the channel member 32 may be sprung apart to permit positioning of the plate 54 under upper flange portions 66 thereof. End plates 68 and 70 are screwed on each end of the channel member 32 to hold the complete toasting panel assembly together. The upper toasting panel assembly 18 is provided with outwardly extending lugs 72 which extend into openings of the handle 16 for pivotally supporting the toasting panel.

A feature of the invention is that a thermostat element 74 (FIGURE 3) for temperature control of the unit is mounted on a pair of spring members 76, 76 and bolted to the underface of the panel assembly 10 to position the thermostatic element 74 against the underface of the plate 54. The thermostat 74 includes a lever arm 78 which extends through a slot 80 in the front face of the toasting panel assembly 10 and which may be moved backwardly and forwardly to adjust the temperature of the heating plates 54 on each of the toasting panel assemblies 10 and 18. Each of the plates 54 of the lower toasting panel assembly 10 and the upper toasting panel assembly 18 are connected in parallel along with a pilot light 82 which is located on the front face of the lower toasting panel assembly 10. A switch 84 is connected in series with the thermostat and to a suitable source of power. The pilot light is located so that when the switch is closed the light will always be lighted regardless of whether the thermostat is directing current to each of the plates 54. The U-shaped member 32 is advantageously vented by means of openings 90 in a bottom wall 92 and similar openings 93 in the back wall 62 which cause a chimney-like venting of the toasting panel assembly 10.

The invention provides a toaster which is particularly adaptable for toasting hot dog rolls which may be uniformly toasted to a rich golden brown coloration. Since the temperature is very uniform over the complete toasting area there is very little likelihood of scorching or burning articles being toasted on the plates. The surfaces of the plates are advantageously roughened to provide a multiplicity of recessed areas through which radiation heating can proceed. The unit permits a large portion of the toasting to be accomplished by radiation and all of the toasting is done with very little power consumption and without any real danger of burning the articles being toasted. The plate 54 may be advantageously sealed in position by an inert waterproof sealing material such as a silicone caulking compound. When desired, it is a simple matter to clean the plates by wiping them with a wet cloth or by scouring with steel wool, if desired.

While a specific embodiment of the invention has been shown and described in detail to illustrate the application of the invention principles, it will be understood that the invention may be embodied otherwise without departing from such principles.

What is claimed is:

A direct-contact type toaster comprising a lower and an upper toasting panel assembly, each panel assembly comprising a channel-shaped member, a raised supporting member positioned in said channel-shaped member resting against the inner recessed face thereof, contact elements supported on and insulated from said supporting member along each edge thereof, a horizontal toasting plate of glass, an electrically conductive material film on the inner surface of said plate for uniformly heating said horizontal plate, electrically conductive strips extending across each end of said plate, said plate being positioned on said contact elements on each side of said supporting member, and an electrical connection to said contact elements for energizing said films of the upper and lower glass toasting plates, a pair of upstanding bracket members, one of said bracket members being mounted on each end of the lower panel assembly near the rear edge thereof, a U-shaped handle including a pair of legs with a handle element extending across between said legs, a first pair of pivots for pivotally mounting the ends of said legs on respective bracket members, a second pair of pivots for pivotally mounting said upper panel assembly within said U-shaped handle, said second pivot means connecting the centers of the ends of said upper panel assembly to the center portions of the legs of said U-shaped handle, said handle being swingable about said first pair of pivots between an upright position wherein the upper glass plate is spaced widely from the lower glass plate and a substantially horizontal position with said handle extending as a guard around the ends and front edge of said upper panel assembly, said second pair of pivot means permitting said upper panel assembly to swing with respect to said handle for the upper glass toasting plate to engage with the upper surface of articles on the lower toasting plate regardless of the position of the handle for accommodating articles of various thicknesses to be toasted, and a pair of coil springs each surrounding one of the pivots of the first pair, one end of each coil spring being connected to the bracket and the other to the leg of the U-shaped handle for applying an upward force tending to support said handle regardless of the position of said handle for providing a low contact pressure of said glass toasting plates against opposite faces of the articles being toasted.

References Cited in the file of this patent

UNITED STATES PATENTS

| | | |
|---|---|---|
| Re. 23,555 | Mochel | Sept. 30, 1952 |
| 1,687,662 | Fay | Oct. 16, 1928 |
| 1,749,173 | Wells | Mar. 4, 1930 |
| 2,108,778 | Morgan | Feb. 15, 1938 |
| 2,563,874 | Salton | Aug. 14, 1951 |
| 2,701,296 | Crawford | Feb. 1, 1955 |
| 2,795,682 | Knoll | June 11, 1957 |
| 2,861,168 | Knoll | Nov. 18, 1958 |
| 2,899,888 | Koci | Aug. 18, 1959 |

FOREIGN PATENTS

| | | |
|---|---|---|
| 246,438 | Great Britain | Aug. 21, 1925 |
| 687,211 | Great Britain | Feb. 11, 1953 |
| 961,371 | Germany | Apr. 4, 1957 |

OTHER REFERENCES

Product Information AP-22, April 30, 1958, Corning Glass Works, Corning, N.Y.